3,332,890
PROCESS OF MAKING COMPOSITE ION EXCHANGE RESIN BODIES
Melvin J. Hatch, Midland, Mich., assignor to The Dow Chemical Company, Midland, Mich., a corporation of Delaware
No Drawing. Filed Mar. 12, 1962, Ser. No. 179,179
3 Claims. (Cl. 260—2.1)

This application is a continuation-in-part of my copending application, Ser. No. 475,003, filed Dec. 13, 1954, now U.S. Patent No. 3,041,292.

This invention concerns a method for making solid, composite, ion exchange resin bodies comprising, throughout a single piece thereof, an intimate mixture of a solid, insoluble, organic resin having a cross-linked molecular structure and an ionizable organic resin that normally is soluble in aqueous media, but that is insolubilized by being entrapped within the body of the solid, insoluble, cross-linked organic resin. The method involves employing, in the preparation of such composite ion exchange resin body, at least one substantially non-ionizable organic starting material that is either polymeric or is reactive, e.g. polymerizable or copolymerizable, to form a polymer as a resin component and that contains in its molecule non-ionizable groups that are readily convertible into ionizable groups and, during preparation of the composite ion exchange resin product, converting such non-ionizable groups into ionizable groups.

In practice of the present invention, a preformed organic resin is brought into intimate admixture with an organic material that is polymerizable to form a different and distinct resin, by causing it to absorb the polymerizable organic material. Either, and at least, one of the starting materials just-mentioned is a non-ionizable organic material which contains in molecules thereof non-ionizable groups that are readily convertible in known ways, e.g. by hydrolysis or by amination, into ionizable groups. One of said starting materials either initially is, or is reactive during the process to form, an ionizable resin of a kind which alone, i.e. in the absence of another of the resin components of the final product, is normally soluble in aqueous media such as water, or an aqueous solution of an acid, a base, or a salt. One of the resins just-mentioned, i.e. the resin starting material, is a solid, insoluble resin having a cross-linked molecular structure.

Within the limits of the general requirements just-stated, the starting mixture may contain any of several combinations of the different essential starting materials mentioned above. For instance the solid, insoluble, cross-linked resin starting material may be either an ionizable resin, or non-ionizable resin containing groups in its molecule that are readily convertible into ionizable groups so as to render the resulting resin material ionizable, or it may be a permanently non-ionizable, solid, cross-linked resin.

A considerable number and variety of such solid, insoluble, cross-linked resins, suitable for use in the present process, are known. Examples of such resins are copolymers of a major proportion by weight of any one or more monovinyl aromatic compounds, such as styrene, ar-chlorostyrene, ar-vinyltoluene, or ar-ethylvinylbenzene, etc., and a minor proportion, e.g. from 0.5 to 15 weight percent, of divinylbenzene; nuclear chloromethylated copolymers of any of the kinds just-mentioned; nuclear sulfonated copolymers of any of the kinds just-mentioned; copolymers of acrylic acid, ethylvinylbenzene and divinylbenzene; copolymers of methacrylic acid, ethylvinylbenzene and divinylbenzene; copolymers of methacrylic acid, ethylvinylbenzene and divinylbenzene; copolymers of styrene, ethylvinylbenzene and divinylbenzene containing quaternary ammonium radicals, e.g. the $-CH_2N(CH_3)_3^+$ radical, as nuclear substituents; copolymers of styrene, ar-ethylvinylbenzene and divinylbenzene containing polyalkylpolyamine groups, such as $-CH_2NHCH_2CH_2NH_2$ groups as nuclear substituents; and solid, insoluble phenolformaldehyde resins; etc.

When used as a starting material in the process, an insoluble resin should be sufficiently permeable to permit it to absorb liquids, especially the polymerizable liquid organic starting material, and for this purpose it is either cross-linked, e.g. in any of the many well known ways, to an extent corresponding to the presence of 20 percent by weight or less, preferably from 0.5 to 15 weight percent, of divinylbenzene as the only cross-linking agent chemically combined therein or, if more highly cross-linked, is preformed by polymerization of the corresponding monomeric material under conditions, known in the art, which cause formation of the solid, insoluble, cross-linked polymer as an appreciable porous, liquid-permeable body.

The solid, insoluble resin as a starting material, is soaked with, and thus caused to absorb, a liquid or liquefied organic material that contains, in molecules thereof, groups that are either ionized or are readily convertible into ionized groups and that is polymerizable to form a substantially linear type of polymer that is either ionizable in aqueous media or that contains groups in its molecule which are readily convertible into ionizable groups, which latter polymer, in its final ionizable form, is of a kind normally soluble in aqueous media such as water or an aqueous solution of an acid, a base, or a salt. A number of organic materials having such groups in molecules thereof and having a property of being polymerizable to form linear polymers of at least fairly high molecular weight, e.g. of 3000 or higher molecular weight as determined by the well-known Staudinger method, are known in the art. Examples of such polymerizable organic starting materials are acrylic acid and its alkali, i.e. alkali metal and ammonium salts; methacrylic acid and its alkali salts; alkyl acrylates and alkyl methacrylates such as methyl acrylate, ethyl acrylate, propyl acrylate, isopropyl acrylate, methyl methacrylate and ethyl methacrylate; and mixtures of styrene and maleic anhydride, e.g. in equimolecular proportions; ethyleneimine; ar-vinylbenzyl chloride; and ar-vinylbenzyltrimethylammonium chloride; etc.

Many of the polymerizable starting materials just-mentioned are liquid at room temperature or at moderately elevated temperatures, e.g. from 30° to 100° C., and can, if desired, be absorbed directly, in undiluted liquid form, by the solid, insoluble, cross-linked resin starting material. The polymerizable organic starting material may, if desired, first be dissolved in a liquid solvent, inert both to it and to the polymer starting material, and the solution be absorbed in the starting polymer. Water often can be used as the inert solvent and, when suitable, is preferred. Other liquids which usually are inert and therefore suitable for use with polymerizable organic materials soluble therein are benzene, toluene, xylene, carbon tetrachloride, ethylene chloride, methanol, ethanol, acetone and dioxane, etc.

A requirement common to all of the hereinbefore-mentioned mixtures of starting materials is that each such mixture contains at least one resin or resin-forming, i.e. polymerizable, starting material which contains, in molecules thereof, non-ionizable groups, e.g. ester, anhydride, or halomethyl groups, that are readily convertible in known ways into ionizable groups.

A minor proportion, e.g. corresponding to between 0.05 and 5 percent of the polymerizable starting material, of a polymerization catalyst such as sodium persulfate, potassium persulfate, hydrogen peroxide, benzoyl peroxide, tertiary-butyl hydroperoxide, di-(tertiary-butyl) peroxide, or a redox catalyst is usually dissolved in the liquid phase of any of the starting mixtures mentioned above, but the presence of a polymerization catalyst is not always required. Other additives such as plasticizers, lubricants, fillers, etc., may also be added to any of the starting mixtures, but are not required.

The mixture is brought to, or maintained at, a temperature such as to polymerize the polymerizable starting material and thus form a solid polymeric mass or body. The polymerization can be accomplished by direct heating of any of the above-described reaction mixtures, or small pieces or droplets of the starting mixture can be dispersed in a body of a liquid in which the starting mixture and its components are relatively insoluble and the resulting mixture be subjected to a polymerization temperature so as to polymerize the polymerizable organic starting material and thereby form a composite resin product directly as small beads or granules. The polymerization sometimes occurs at room temperature, especially in instances in which the monomers present undergo an addition, rather than condensation, type of polymerization reaction and a catalyst is present to accelerate the reaction. Often the mixture is heated, e.g. at from 30° to 100° C. or above, to accomplish the reaction at a fairly rapid rate. When either the resin, or the resin-forming, starting material contains non-ionizable, hydrolyzable groups, such as ester or carboxylic acid anhydride groups, in molecules thereof and the polymerization mixture contains an aqueous liquid, such as water or an aqueous solution of an acid or a base, such groups sometimes undergo hydrolysis while carrying out the polymerization and are thereby converted into ionizable groups. In such an instance, the product obtained at this stage in the process may be a composite ion exchange resin body suitable for use in ion exchange processes.

However, the composite resin material thus formed is sometimes soft or gelatinous. It may require treatment, e.g. to harden it or to convert a non-ionizable resin component thereof into an ionizable resin, as hereinafter described. When necessary, it is separated, e.g. by decanting or filtering, from any remaining unabsorbed liquid and is heated to higher temperatures, e.g. from 100° to 250° C. or above, to further the polymerization and harden the product. The composite resin body is ground, pulverized, or otherwise comminuted, when necessary, to bring it to a granular form suitable for further processing and/or for use as an ion exchange material when fully conditioned.

Usually, the solid, insoluble composite resin product resulting from the above-described steps contains a nonionizable resin component that is convertible into an ionizable resin and requires further treatment to effect this conversion. When such non-ionizable, but convertible, resin component is one containing hydrolyzable groups, such as ester or carboxylic anhydride groups, the composite resin is heated together with sufficient water or aqueous alkali or aqueous mineral acid solution, e.g. to about the boiling temperature under reflux, so as to accomplish the hydrolysis and convert said nonionizable resin component into a corresponding ionizable resin carboxylic acid or a salt thereof. When the nonionizable, but convertible resin component is one containing, in molecules thereof, chloromethyl groups, the composite resin body may be subjected to an ammonolysis reaction, e.g. by heating it together with an excess over the stoichiometric amount of an ammonolysis agent such as ammonia, trimethylamine, triethylamine, dimethyl ethanolamine, or diethylenetriamine, etc., thereby converting said non-ionizable resin component into an ionizable anion-exchanger resin componet. Procedures and conditions for such conversions of anhydride, ester, and chloromethyl groups into ionizable groups are well known in the art and can be applied in accomplishing the respective conversions just-mentioned.

The resulting insoluble, composite ion exchange resin body in granular form is washed thoroughly with water. In some instances there may be intervening steps of conditioning the granules by washing them with an aqueous solution of an inorganic salt, an aqueous acid, or an aqueous base, prior to the washing with water alone, but such intervening steps are not required. The water-washed granular product is in condition for use as an ion exchange agent, e.g. for the chemical absorption of ions from solutions contacted therewith, in usual ways.

The method as just described, permits the production of composite ion exchange resin bodies, comprising a normally soluble, but insolubilized, ion exchanger resin component, which composite ion exchange resin bodies are either cationic, or anionic, or amphoteric. In instances in which the composite ion exchange resin product is not amphoteric, i.e. is either a cation exchange resin or an anion exchange resin, it can, after becoming loaded with chemical absorbed ions through use in an ion exchange process, be regenerated only by treatment with a chemically reactive regenerating agent such as an aqueous solution of an acid, a base, or a salt. However, when the composite ion exchange resin body is an amphoteric material containing an intimate mixture of a cation exchanging resin and of a different and anion exchanging resin throughout a granule thereof it can, after becoming thus loaded with chemically absorbed ions, be regenerated either by treatment with a chemically reactive regenerating agent such as an aqueous solution of an acid, a base, or a salt, or by merely being washed with water. In such water washing regeneration operation, the cation- and anion-exchanging resin components, presumably because of being intimately mixed together within the individual granules, appear to function as regenerating agents for one another, thus releasing chemically absorbed ions into the wash water. Such regeneration by washing with water may be carried out at any temperature at which the water is liquid, e.g. at from 0° to 100° C. at atmospheric pressure.

The following examples, illustrative of ways of practicing the invention, are not to be construed as limiting.

*Example 1*

This example describes the preparation and testing of a water-insoluble amphoteric, composite ion exchange resin body comprising, throughout a single piece thereof, an intimate mixture of a normally water-soluble styrene-maleic acid copolymer and Dowex-1 (a water-insoluble cross-linked copolymer of a major amount by weight of styrene and minor amounts of ethylvinylbenzene and divinylbenzene; which copolymer contains quaternary ammonium, i.e. $-CH_2N(CH_3)_3^+$, radicals as substituents on aromatic nuclei thereof).

A granular, water-insoluble, cross-linked copolymer of about 92 weight percent styrene, about 4 percent arethylvinylbenzene and about 4 percent divinylbenzene was nuclear-chloromethylated in known manner. The product contained an average of about 0.7 chloromethyl radicals per aromatic nucleus. To 75 grams of this chloromethylated copolymer there was added a solution of 49 grams of maleic anhydride in a mixture of 50 ml. of styrene, 25 ml. of methylene chloride and 25 ml. of methylethyl ketone. The mixture was shaken and then allowed to stand at room temperature for 0.5 hour. The granules, i.e. beads, become swollen by absorption of a considerable amount of said solution. Approximately 0.5 ml. of tertiary butyl hydroperoxide was added to the mixture, and the latter was shaken and allowed to stand in a stoppered flask. After about 10 minutes it was noted that the copolymer beads had become more highly swollen and the mixture had warmed spontaneously. Thereafter the stopper blew from the flask and a small portion of the beads were lost. About 0.5 hour later the flask was again stoppered. The flask and its contents were next heated overnight at 60° C. and then allowed to stand at room temperature for several days. The thus-treated beads were shaken with acetone, removed by filtration and air-dried for 0.5 hour. They then weighed 123 grams. To 60 grams of the beads, 150 ml. of methylene chloride was added. The beads became swollen by absorption of methylene chloride. Thereafter, approximately 250 ml. of an aqueous 25 weight percent trimethylamine solution was added to the mixture. The resulting mixture was stirred, without external heating of the same, for 43 hours in a flask equipped with a reflux condenser. Thereafter, the mixture was heated to boiling under reflux for 5 hours. The mixture was then filtered and the beads were rinsed successively with water, acetone and again with water. The settled bed volume of the water-wetted beads was 126 ml. A mixture of 123 ml. of the bed of beads and 350 ml. of a 2.5-normal aqueous sodium hydroxide solution was heated on a steam bath overnight for purpose of converting carboxylic acid anhydride radicals of the styrene-maleic anhydride copolymer component of the beads into sodium carboxylate radicals. A bed of the thus-treated beads was rinsed successively with water, with 800 ml. of a 5-normal sodium chloride solution and with more than 5 liters of water. For convenience, the thus-treated beads will be termed "beads A." A measured portion of the bed of the thus-treated "beads A" was analyzed for chloride ions by titration with a standard silver nitrate solution. The beads were found to contain 0.05 gram milliequivalent of ionizable chloride ions per ml. of a settled bed of the water-wet beads. Another 15 ml. portion of the "beads A" was washed, as a bed in a column, with 6 bed volumes of concentrated hydrochloric acid and then with 12 bed volumes of deionized water. Beads from the bed were then analyzed and found to contain 0.60 gram milliequivalents of ionizable chloride ions per ml. of a settled bed of the water-wet beads, i.e. the anion exchange capacity of the beads was approximately 0.60 gram milliequivalents per ml. of a water-wet bed of the beads. Another portion of the bed of "beads A" was slurried together with 40 times its bed volume of a 6-normal aqueous sodium hydroxide solution and the mixture was allowed to stand overnight. The mixture was the filtered and the beads were rinsed, as a bed in a column, first with 20 bed volumes of a 1-normal aqueous ammonium chloride solution and thereafter with 20 bed volumes of deionized water. A portion of the bed was then analyzed to determine the ammonium ion content of the beads. The beads were found to contain 0.19 gram milliequivalents of ionizable ammonium ions per ml. of the settled bed of the water-wet beads, i.e. the cation exchange capacity of the water-wet beads was 0.19 gram milliequivalents per ml. of a bed of the beads.

A 73 ml. bed of the "beads A" in a column of 1.5 cm. internal diameter was rinsed first with 500 ml. of a saturated aqueous sodium chloride solution and then with several liters of water. Thereafter, a starting solution, having a volume of 6 ml. and consisting of 2 grams of sucrose and 0.0105 gram mole of sodium chloride dissolved in water, was fed at a rate of 3 ml. per minute to the water-immersed bed of the beads in a manner causing flow-through the bed and displacement of a corresponding volume of liquid from the other end of the bed. Deionized water, in amount sufficient to displace the sucrose and sodium chloride from the bed, was then fed at a rate of 3 ml. per minute to the bed. The resulting effluent liquor was collected in successive fractions and each fraction was tested and analyzed to determine its index of refraction and the concentration of chloride ions therein. The increases in the index of refraction values over that of water alone are due principally to the presence of sucrose in the fractions and only to a minor extent to the presence of sodium chloride and the index of refraction values become greater with increase in the concentration of sugar. Accordingly, the index of refraction values indicate the relative concentrations of sucrose in the several effluent liquor fractions. The chloride ion values represent the molar concentrations of sodium chloride in the effluent liquor fractions. The results obtained are as set forth in the following table.

TABLE

| Effluent Liquor Fractions | | Index of Refraction $N_{35}^D$ | Molar concentration of Chloride Ions | Solute in Highest Conc. |
|---|---|---|---|---|
| No. | Volume of Fraction, ml. | | | |
| 1 | 29 | 1.3308 | 0.026 | Nil. |
| 2 | 5 | 1.3311 | 0.028 | Nil. |
| 3 | 5 | 1.3441 | 0.030 | Sucrose. |
| 4 | 5 | 1.3471 | 0.032 | Do. |
| 5 | 5 | 1.3432 | 0.060 | Do. |
| 6 | 5 | 1.3369 | 0.090 | Sucrose+NaCl. |
| 7 | 5 | 1.3341 | 0.159 | NaCl+Sucrose. |
| 8 | 5 | 1.3334 | 0.232 | NaCl. |
| 9 | 5 | 1.3334 | 0.250 | NaCl. |
| 10 | 3.5 | 1.3330 | 0.270 | NaCl. |
| 11 | 5 | 1.3330 | 0.226 | NaCl. |
| 12 | 5 | 1.3328 | 0.200 | NaCl. |
| 13 | 5 | 1.3321 | 0.160 | NaCl. |
| 14 | 5 | 1.3320 | 0.140 | NaCl. |
| 15 | 5 | 1.3319 | 0.100 | NaCl. |
| 16 | 5 | 1.3313 | 0.080 | NaCl. |
| 17 | 10 | 1.3312 | 0.060 | NaCl. |
| 18 | 10 | 1.3311 | 0.050 | NaCl. |
| 19 | 10 | 1.3309 | 0.040 | NaCl. |

Another ion exchange experiment was carried out as just described except that the starting solution fed to the bed of beads had a volume of 73 ml. and consisted of an aqueous solution of magnesium chloride in 0.31-normal concentration and of zinc chloride in 0.20-normal concentration and that each of the successive fractions of the effluent liquor was analyzed to determine the respective concentrations of magnesium and zinc ions therein. The results obtained are given in the following table.

TABLE

| Effluent Liquor Fractions | | Normality in— | | Solute in Highest Conc. |
|---|---|---|---|---|
| No. | Volume of Fraction, ml. | $Mg^{++}$ | $Zn^{++}$ | |
| 1 | 30 | Nil | Nil | Nearly pure water. |
| 2 | 15 | 0.134 | Nil | $MgCl_2$. |
| 3 | 15 | 0.250 | Nil | $MgCl_2$. |
| 4 | 15 | 0.270 | Nil | $MgCl_2$. |
| 5 | 15 | 0.300 | Nil | $MgCl_2$. |
| 6 | 15 | 0.340 | 0.016 | $MgCl_2$. |
| 7 | 15 | 0.146 | 0.140 | $MgCl_2$. |
| 8 | 15 | 0.046 | 0.170 | $ZnCl_2$. |
| 9 | 15 | 0.020 | 0.114 | $ZnCl_2$. |
| 10 | 15 | 0.020 | 0.068 | $ZnCl_2$. |
| 11 | 15 | 0.020 | 0.048 | $ZnCl_2$. |
| 12 | 15 | Nil | 0.034 | $ZnCl_2$. |
| 13 | 15 | Nil | 0.025 | $ZnCl_2$. |
| 14 | 20 | Nil | 0.022 | $ZnCl_2$. |

*Example 2*

To 30 grams of a nuclear chloromethylated copolymer of styrene, ethylvinylbenzene and divinylbenzene in the form of small beads or granules (which chloromethylated copolymer was similar to that employed as a starting material in Example 1) there were added at or near the start of three successive treatments: (1) 14 ml. of glacial acrylic acid, 28 ml. of styrene, 10 ml. of benzene and 0.2 ml. of tertiary-butyl-hydroperoxide; (2) 18 ml. of glacial acrylic acid and 36 ml. of styrene; and (3) 10 ml. of glacial acrylic acid, 20 ml. of styrene, 20 ml. of benzene and 0.3 gram of benzoyl peroxide; respectively. After the first such addition, the mixture was shaken and then allowed to stand overnight in a stoppered bottle without being heated. Air was then displaced from the bottle with nitrogen and the mixture was heated at 60° C. overngiht in the closed bottle. The mixture was then slurried together with acetone and the resulting mixture filtered and the resin beads were air-dried. After the second of the above additions, the mixture was shaken at room temperature for 45 minutes and filtered. The residue of resin beads was heated at 75° C. overnight in contact with an atmosphere of nitrogen and in a closed container. The beads were washed with acetone and then separated by filtration and air-dried. The third of the above additions of liquids to the beads was then made. The liquids thus added were completely absorbed by the beads on permitting the mixture to stand at room temperature for one hour. The thus treated beads were heated at 75° C. in a closed container and in contact with an atmosphere of nitrogen for 75 minutes. The beads were then removed from the container, washed with acetone and the mixture was filtered. The filtrates from the above-mentioned operations of washing the beads were analyzed and found to contain a total of 296 gram milliequivalents of acrylic acid as such and as dissolved polymers thereof. In the foregoing steps the beads had been treated with mixtures of styrene and acrylic acid containing a total of about 602 gram milliequivalents of acrylic acid; hence, it is evident that about 306 gram milliequivalents of acrylic acid had been absorbed, and copolymerized with styrene, within the beads. The beads were next immersed in methylchloroform and swollen by absorption of the latter. The swollen beads were stirred at room temperature together with 150 ml. of an aqueous trimethylamine solution of 17 weight percent concentration for 16 hours after which the mixture was heated to boiling under reflux for 5 hours. The beads were then washed with water and separated by filtration. The filtrate was found by titration to contain a total of about 10 gram milliequivalents of weak acids. In order to assure substantial completion of the amination reaction, the beads were swollen by being caused to absorb mehtylene chloride and the swollen beads were stirred together with 300 ml. of an aqueous trimethyl amine solution of 18 weight percent concentration and the mixture was heated to boiling under reflux for 18 hours. The composite ion exchange resin product thus obtained contains a major proportion of its cationic and anionic groups in an amphoteric relationship with one another such that, after being washed thoroughly with water and then contacted with an aqueous solution of a salt such as ammonium chloride to cause chemical absorption of both cations and anions of the salt from the solution, the amphoterically absorbed cations and anions can be desorbed from the composite ion exchange resin by washing the latter with wafer. From such tests of the product, it is estimated that the composite ion exchange resin has an amphoteric ion absorptive capacity of about 1.1 gram milliequivalents of cations and about 1.1 gram milliequivalents of anions per ml. of a water-wet settled bed of the resin. In addition, it has much smaller, but appreciable, capacities to chemcially absorb cations and anions in forms not readily removable by washing with water alone, but capable of removal by treatment with conventional chemically reactive regenerating agents such as with aqueous solutions of HCl or NaOH, respectively. In two sepaarte tests, the composite ion exchange resin product was used for the treatment of (1) an aqueous solution of copper sulfate in 0.1-normal concentration and of ferrous sulfate in 0.09-normal concentration and of (2) an aqueous solution of sodium chloride in 1.9-normal concentration and of sucrose in 30 weight percent concentration, respectively, to determine its effectiveness in causing a separation from one another of the solutes present in each such starting solution. In each such test, one bed volume or less of the starting solution was slowly fed to a water-immersed bed of the pre-water-washed composite ion exchange resin in a manner causing flow of the liquids through and from the bed. A larger volume of deionized water was then similarly fed to the bed. The operations just-mentioned constitute an operating cycle which may be repeated. In one such cycle during each test, the effluent liquor, displaced from the bed by the liquor feeding operations, was collected in successive fractions and each fraction was tested to determine the concentrations therein of the respective solutes that had been present in the starting solution. In the test using the starting solution of copper sulfate and ferrous sulfate it was found an early solute containing effluent liquor fraction was far richer in ferrous sulfate, on a normality basis, than in copper sulfate and that a subsequent effluent liquor fraction was richer in copper sulfate than in ferrous sulfate. Similarly, in the test using the starting solution of sucrose and sodium chloride, an early solute-containing effluent liquor fraction contained a far higher weight ratio of sucrose to fructose than the starting solution and a subsequent effluent liquor fraction contained a higher weight ratio of sodium chloride to fructose than the starting solution.

I claim:

1. A method for making a solid, composite, ion exchange resin body that is insoluble in aqueous media and that comprises throughout a single piece thereof an intimate mixture of a solid, insoluble, crosslinked, organic resin and an ionizable, organic resin that normally is soluble in aqueous media and that is insolubilized by being entrapped within the body of the solid, insoluble, crosslinked organic resin, which method comprises
   (1) forming an intimate mixture of a preformed solid, insoluble, crosslinked organic resin having absorbed therein a solution of about equimolecular proportions of maleic anhydride and styrene in an inert organic solvent
   (2) polymerizing said solution of maleic anhydride and styrene while thus-absorbed in the solid, insoluble, crosslinked organic resin starting material present in the mixture and
   (3) converting said non-ionizable anhydride groups, which are then present in molecules of one of the resin components, into ionizable carboxyl groups, one of the resins just-mentioned then being a thus-insolubilized ionizable carboxyl resin of a kind that is normally soluble in aqueous media.

2. A method for making a solid, composite, ion exchange resin body that is insoluble in aqueous media and that comprises throughout a single piece thereof an intimate mixture of a solid, insoluble, cross-linked, organic resin and an ionizable organic resin that normally is soluble in aqueous media and that is insolubilized by being entrapped within the body of the solid, insoluble, crosslinked organic resin, which method comprises forming an intimate mixture of a solid, insoluble, nuclear chloromethylated copolymer of a major proportion by weight of at least one monovinyl aromatic hydrocarbon and a minor proportion of divinylbenzene, having absorbed therein a solution of about equimolecular proportions of styrene and maleic anhydride and an effective amount of a polymerization catalyst in an inert organic solvent, copolymerizing the styrene and maleic anhydride by warming the mixture whereby a solid, insoluble, composite resin body comprising throughout the same an intimate mixture of said insoluble chloromethylated copolymer and of a copolymer of styrene and maleic anhydride is formed, aminating the chloromethylated copolymer component by causing the composite resin body to absorb an aqueous solution of a trialkylamine and heating the resulting mixture, whereby said chloromethylated copolymer is converted into a solid, insoluble, ionizable copolymer component containing quaternary ammonium radicals in molecules thereof, and thereafter hydrolyzing the styrene-maleic anhydride copolymer component by heating the thus-treated composite ion exchange resin body together with an aqueous alkali metal hydroxide solution.

3. A method for making a solid, composite, ion exchange resin body that is insoluble in aqueous media and that comprises throughout a single piece thereof an intimate mixture of a solid, insoluble, cross-linked, organic resin and an ionizable organic resin that normally is soluble in aqueous media and that is insolubilized by being entrapped within the body of the solid, insoluble, crosslinked organic resin, which method comprises forming an intimate mixture of a solid, insoluble, nuclear chloromethylated copolymer, of a major proportion by weight of at least one monovinyl aromatic hydrocarbon and a minor proportion of divinylbenzene, having an acrylic acid-containing solution and a polymerization catalyst absorbed therein, polymerizing the acrylic acid while it is thus-absorbed, whereby a solid, insoluble composite resin body comprising throughout the same an intimate mixture of said chloromethylated copolymer and of an acrylic acid polymer is formed, and aminating said chloromethylated copolymer by causing the composite resin body to absorb an aqueous solution of a trialkylamine and heating the resulting mixture, whereby said chloromethylated copolymer is converted into a solid, insoluble ionizable copolymer component containing quaternary ammonium radicals in molecules thereof and a solid, insoluble, amphoteric composite ion exchange resin is obtained.

References Cited

UNITED STATES PATENTS

| | | | |
|---|---|---|---|
| 2,461,505 | 2/1949 | Daniel | 260—2.1 XR |
| 2,593,417 | 4/1952 | D'Alelio | 260—2.2 XR |
| 3,041,292 | 6/1962 | Hatch. | |
| 3,083,118 | 3/1963 | Bridgeford | 260—2.2 |
| 3,122,514 | 2/1964 | Abiams | 260—2.1 |
| 3,143,521 | 8/1964 | Thompson et al. | 260—2.1 |

FOREIGN PATENTS

| | | |
|---|---|---|
| 681,411 | 10/1952 | Great Britain. |
| 728,508 | 4/1955 | Great Britain. |

MURRAY TILLMAN, *Primary Examiner.*

LEON J. BERCOVITZ, SAMUEL H. BLECH,
*Examiners.*

J. A. KOLASCH, G. F. LESMES, E. B. WOODRUFF,
*Assistant Examiners.*